US011155322B2

(12) United States Patent
Baros

(10) Patent No.: US 11,155,322 B2
(45) Date of Patent: Oct. 26, 2021

(54) WATERTIGHT ELECTRIC ACTUATOR FOR TRIM TAB ASSEMBLY OR WAKE GATE ASSEMBLY

(71) Applicant: Marine Canada Acquisition Inc., Richmond (CA)

(72) Inventor: Davor Baros, Vancouver (CA)

(73) Assignee: MARINE CANADA ACQUISITION INC., Richmond (CA)

( * ) Notice: Subject to any disclaimer, the term of this patent is extended or adjusted under 35 U.S.C. 154(b) by 0 days.

(21) Appl. No.: 16/590,363

(22) Filed: Oct. 1, 2019

(65) Prior Publication Data

US 2020/0102053 A1    Apr. 2, 2020

Related U.S. Application Data

(60) Provisional application No. 62/739,836, filed on Oct. 1, 2018.

(51) Int. Cl.
| | |
|---|---|
| *H02K 7/06* | (2006.01) |
| *H02K 7/08* | (2006.01) |
| *H02K 7/116* | (2006.01) |
| *B63B 1/32* | (2006.01) |
| *H02K 5/132* | (2006.01) |
| *B63J 3/00* | (2006.01) |

(52) U.S. Cl.
CPC .................... *B63B 1/32* (2013.01); *B63J 3/00* (2013.01); *H02K 5/132* (2013.01); *H02K 7/06* (2013.01); *H02K 7/08* (2013.01); *H02K 7/116* (2013.01); *B63J 2003/002* (2013.01); *B63J 2003/005* (2013.01); *H02K 2205/09* (2013.01)

(58) Field of Classification Search
CPC ........ B63B 1/32; B63B 39/061; H02K 5/132; H02K 7/06; H02K 7/08; H02K 7/116; H02K 2205/09; B63J 3/00; B63J 2003/005; B63J 2003/002; F16H 25/20
USPC ........................................................ 74/89.23
See application file for complete search history.

(56) References Cited

U.S. PATENT DOCUMENTS

| | | |
|---|---|---|
| 2,357,465 A | 9/1944 | Focht |
| 2,640,665 A | 6/1953 | Gibb |
| | (Continued) | |

FOREIGN PATENT DOCUMENTS

| | | | |
|---|---|---|---|
| DE | 102007037484 A1 * | 2/2009 | .......... B62D 5/0448 |
| EP | 0921068 A2 | 6/1999 | |
| | (Continued) | | |

OTHER PUBLICATIONS

International Search Report & Written Opinion from related International Application No. PCT/CA2019/051408.

*Primary Examiner* — Anthony D Wiest
(74) *Attorney, Agent, or Firm* — Berenato & White, LLC

(57) ABSTRACT

An actuator comprises a housing and a drive tube assembly disposed within the housing. The drive tube assembly includes a drive tube provided with internal threads, a piston nut provided with external threads which threadedly engage the inner threads of the drive tube, and an output shaft connected to the piston nut. A motor rotates the drive tube to cause the piston nut to reciprocate along a length of the drive tube and the output shaft to reciprocate relative to the housing. There are bearings which transmit axial loads from the drive tube to the housing and transmit radial loads from the drive tube to the housing.

18 Claims, 11 Drawing Sheets

(56) References Cited

U.S. PATENT DOCUMENTS

| | | | |
|---|---|---|---|
| 2,679,367 A | 5/1954 | Pribil et al. | |
| 3,062,167 A | 11/1962 | Bennett | |
| 3,577,948 A | 5/1971 | Frey | |
| 3,601,078 A | 8/1971 | Bedford, Jr. | |
| 3,628,484 A | 12/1971 | Banner | |
| 3,650,310 A | 3/1972 | Childress | |
| 3,695,204 A | 10/1972 | Bennett | |
| 3,760,758 A | 9/1973 | Banner | |
| 3,769,927 A | 11/1973 | Carney | |
| 3,783,817 A | 1/1974 | Banner | |
| D235,635 S | 7/1975 | Curtis | |
| 3,955,527 A | 5/1976 | Holtermann | |
| 4,261,278 A | 4/1981 | Gaudin | |
| 4,355,985 A | 10/1982 | Borst et al. | |
| 4,420,741 A | 12/1983 | West | |
| 4,742,794 A | 5/1988 | Hagstrom | |
| 4,759,732 A | 7/1988 | Atsumi | |
| 4,854,259 A | 8/1989 | Cluett | |
| 4,908,766 A | 3/1990 | Takeuchi | |
| 5,474,013 A | 12/1995 | Wittmaier | |
| 5,491,372 A * | 2/1996 | Erhart | F04B 7/00 310/80 |
| 5,524,567 A | 6/1996 | Astley et al. | |
| 5,557,154 A * | 9/1996 | Erhart | F04B 7/00 310/68 B |
| 5,881,666 A | 3/1999 | Crews | |
| 6,085,684 A | 7/2000 | Cotton | |
| 6,089,177 A | 7/2000 | Mueller | |
| 6,113,443 A | 9/2000 | Eichinger | |
| 6,167,830 B1 | 1/2001 | Pilger | |
| 6,644,081 B1 | 11/2003 | Berry | |
| 6,756,707 B2 * | 6/2004 | Hochhalter | F16H 25/20 310/20 |
| 6,923,136 B1 | 8/2005 | D Alessandro | |
| 7,143,711 B1 | 12/2006 | Wolske | |
| 7,188,581 B1 | 3/2007 | Davis et al. | |
| 7,311,058 B1 | 12/2007 | Brooks et al. | |
| 7,467,596 B2 | 12/2008 | Salmon | |
| 7,631,610 B1 | 12/2009 | Wolske | |
| 8,043,053 B2 | 10/2011 | Bernhard | |
| 8,251,006 B2 | 8/2012 | Kalil | |
| 8,256,710 B2 | 9/2012 | Mason et al. | |
| 8,261,682 B1 | 9/2012 | Devito | |
| 8,387,551 B2 | 3/2013 | Mueller | |
| 8,453,530 B2 * | 6/2013 | Duits | H02K 21/22 74/89.23 |
| 8,707,884 B2 | 4/2014 | Snow | |
| 8,960,031 B2 | 2/2015 | Keech et al. | |
| 9,415,837 B2 | 8/2016 | Wendels | |
| 9,520,756 B2 * | 12/2016 | Fedosovsky | H02K 7/06 |
| 9,683,643 B2 * | 6/2017 | Cyren | F16H 25/2015 |
| 2002/0109427 A1 * | 8/2002 | Hochhalter | H02K 7/06 310/89 |
| 2002/0174818 A1 | 11/2002 | Von Wolske | |
| 2009/0165694 A1 | 7/2009 | Beamer | |
| 2009/0277369 A1 | 11/2009 | Gai et al. | |
| 2010/0186654 A1 | 7/2010 | Buzzi | |
| 2014/0026800 A1 | 1/2014 | Mueller | |
| 2014/0190387 A1 | 7/2014 | Snow | |
| 2014/0318432 A1 | 10/2014 | Wendels | |
| 2015/0263587 A1 * | 9/2015 | Fedosovsky | H02K 7/06 310/68 B |

FOREIGN PATENT DOCUMENTS

| | | |
|---|---|---|
| EP | 2250077 B1 | 2/2018 |
| JP | 2003049921 A | 2/2003 |

* cited by examiner

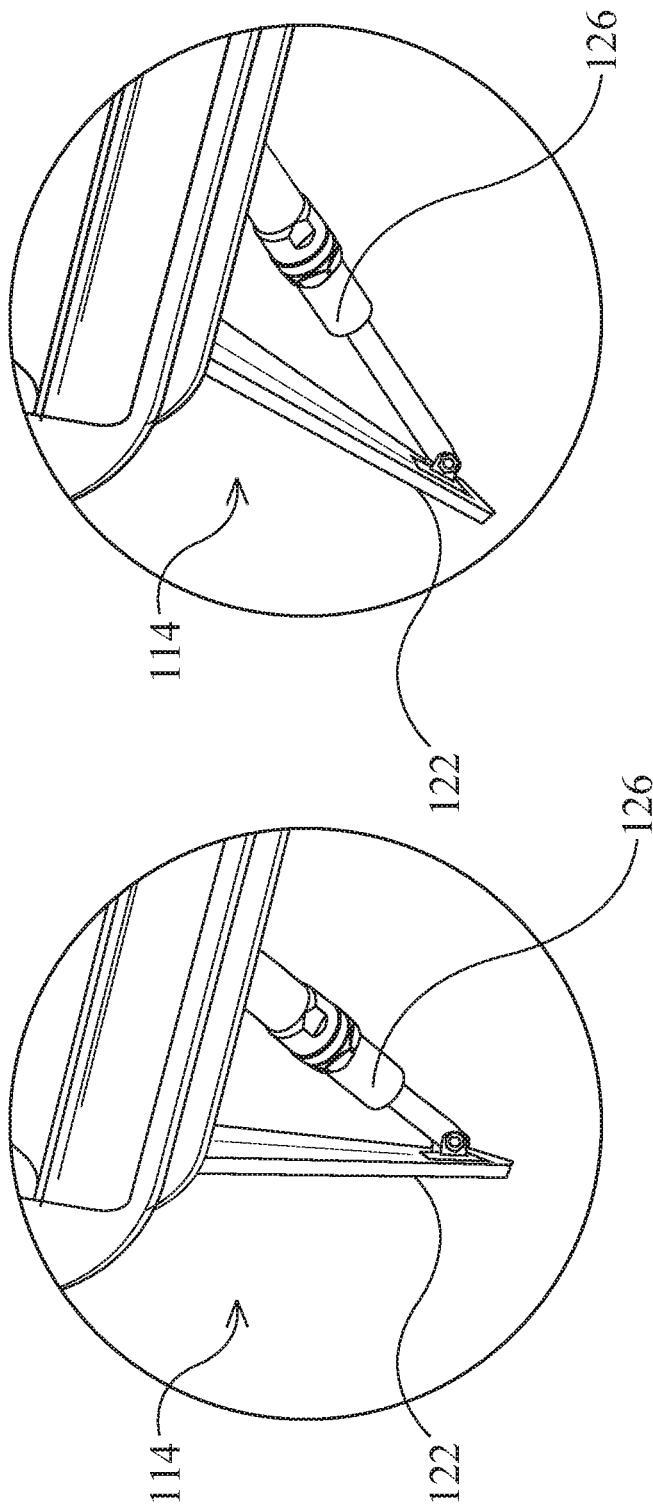

WATERTIGHT ELECTRIC ACTUATOR FOR TRIM TAB ASSEMBLY OR WAKE GATE ASSEMBLY

BACKGROUND

Field of the Disclosure

The present disclosure relates to an electric actuator and, in particular, to a watertight electric actuator for use as part of a trim tab assembly or wake gate assembly.

Description of the Related Art

U.S. Pat. No. 5,881,666 which issued on Mar. 16, 1999, in the name of Crews discloses a trim tab actuator. There is a ram adapted to be connected at a first end to the trim tab and connected at a second end to a drive. The ram has a longitudinal portion equal to at least the maximum stroke of the ram and is received in the longitudinal bore of which longitudinal bore has a length equal to or greater than the maximum stroke of the ram. An inboard seal is disposed between the ram and bore. The inboard seal is positioned inboard of the longitudinal portion of the ram when the ram is retracted.

SUMMARY OF THE DISCLOSURE

It is an object of the present disclosure to provide a watertight electric actuator for use as part of a trim tab assembly or wake gate assembly.

There is accordingly provided an actuator comprising a housing and a drive tube assembly disposed within the housing. The drive tube assembly includes a drive tube provided with internal threads, a piston nut provided with external threads which threadedly engage the internal threads of the drive tube, and an output shaft connected to the piston nut. A motor rotates the drive tube to cause the piston nut to reciprocate along a length of the drive tube and the output shaft to reciprocate relative to the housing. There are bearings which transmit axial loads from the drive tube to the housing and transmit radial loads from the drive tube to the housing.

The piston nut may be threadedly connected to the output shaft. A diameter of the external threads of the piston nut may be larger in diameter than threads that threadedly connect the piston nut to the output shaft. There may be a planetary gear reduction coupling the motor to the drive tube. There may be a vent tube allowing fluid communication between the atmosphere and an interior of the housing. The actuator may be watertight. The actuator is part of a trim tab assembly or a wake gate assembly.

There is also provided an actuator comprising a housing and a drive shaft assembly disposed within the housing. The drive shaft assembly includes a drive shaft provided with external threads, a piston nut provided with internal threads which threadedly engage the external threads of the drive shaft, and an output shaft connected to the piston nut. A motor rotates the drive shaft to cause the piston nut to reciprocate along a length of the drive shaft and the output shaft to reciprocate relative to the housing. There are bearings which transmit axial loads from the drive shaft to the housing and transmit radial loads from the drive shaft to the housing.

The piston nut may be threadedly connected to the output shaft. A diameter of the internal threads of the piston nut may be larger in diameter than threads that threadedly connect the piston nut to the output shaft. There may be a planetary gear reduction coupling the motor to the drive shaft. There may be a vent tube allowing fluid communication between the atmosphere and an interior of the housing. The actuator may be watertight. The actuator is part of a trim tab assembly or a wake gate assembly.

BRIEF DESCRIPTIONS OF DRAWINGS

The disclosure will be more readily understood from the following description of the embodiments thereof given, by way of example only, with reference to the accompanying drawings, in which:

FIG. 9 is an enlarged view of a port wake gate assembly of the marine vessel of FIG. 8 shown in a retracted configuration;

FIG. 10 is an enlarged view of the port wake gate assembly of the marine vessel of FIG. 8 shown in a deployed configuration;

DESCRIPTIONS OF THE SPECIFIC EMBODIMENTS

Figure 1:
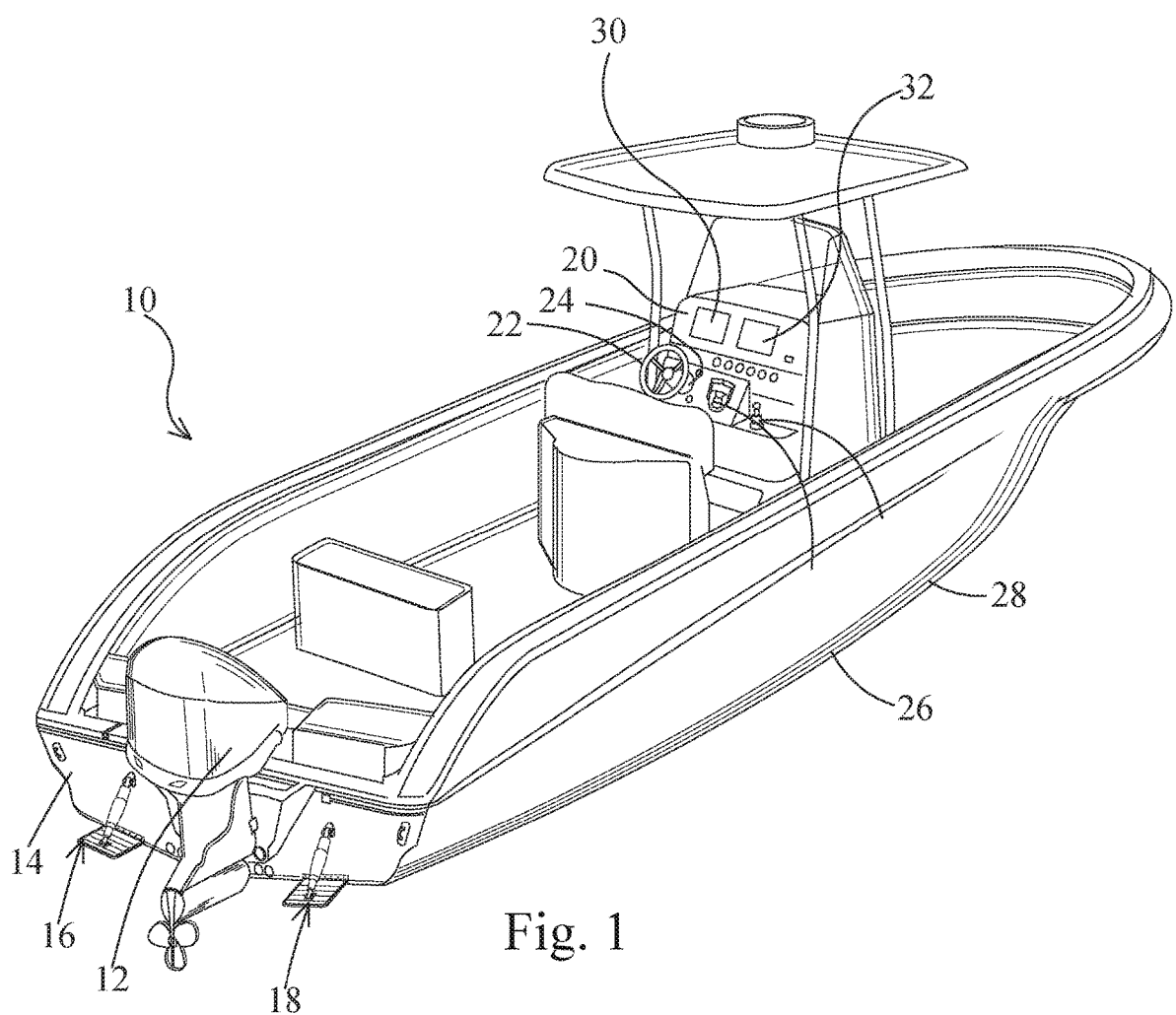
FIG. 1 is a perspective view of a marine vessel provided with trim tab assemblies.

Referring to the drawings and first to FIG. 1, there is shown a marine vessel 10 which is provided with a propulsion unit which, in this example, is in the form of an outboard engine 12 mounted on a transom 14 of the marine vessel 10. However, the marine vessel 10 may be provided with any number or form of propulsion units in other examples. The marine vessel 10 is also provided with a port trim tab assembly 16 and a starboard trim tab assembly 18. The port trim tab assembly 16 and the starboard trim tab assembly 18 are each mounted on the transom 14 of the marine vessel 10 in a conventional manner. There is a control station 20 that supports a steering wheel 22 mounted on a helm 24, a control head 26, and a joystick 28. The control station 20 further includes a first display interface 30 and a second display interface 32. In this example, the first display interface 30 is a SIMRAD® display interface which displays navigational information and the second display interface 32 is an OPTIMUS® display which displays onboard system information. The control station 20 allows an operator to steer the outboard engine 12 and deploy and retract the port trim tab assembly 16 and the starboard trim tab assembly 18 in a generally conventional manner.

Figure 2:
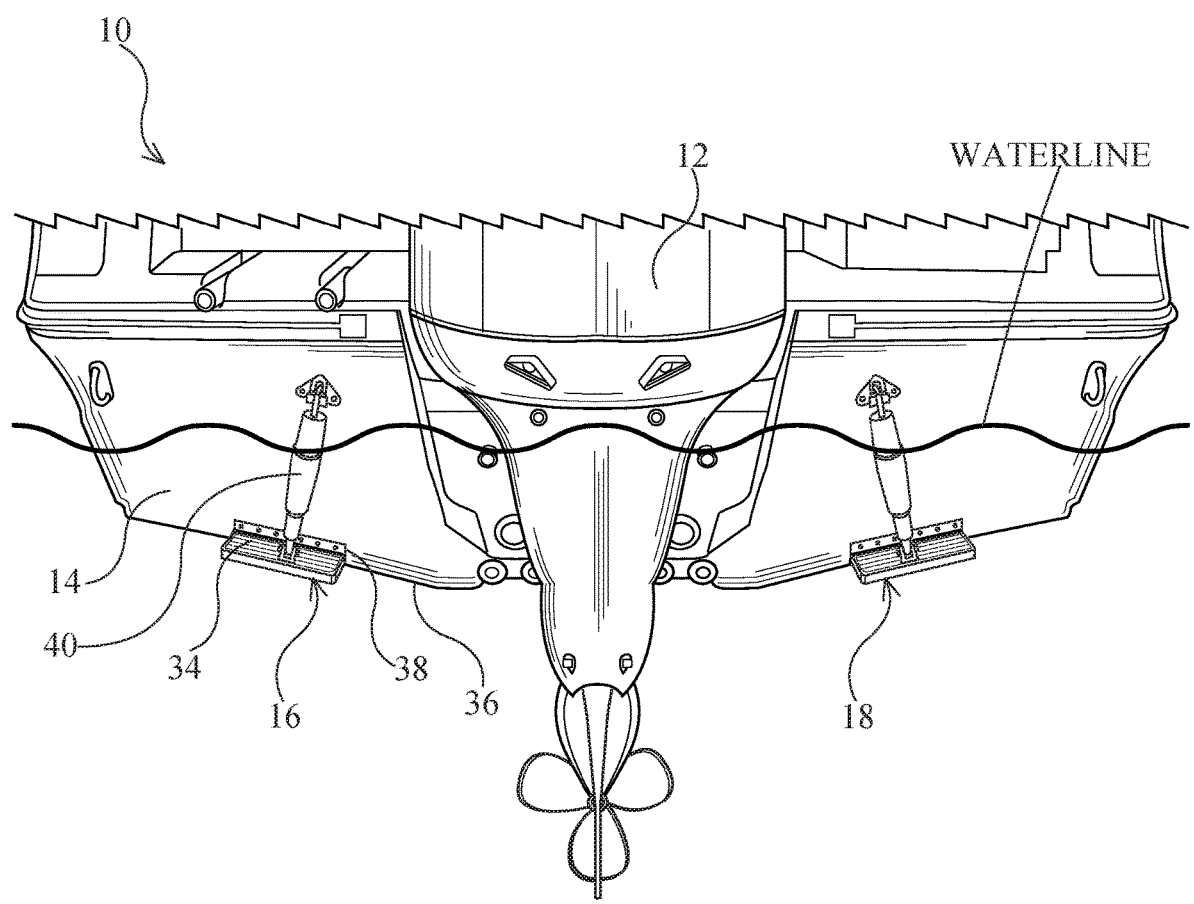
FIG. 2 is an end view of the marine vessel of FIG. 1 showing the trim tab assemblies mounted on a transom thereof.
Figure 4:
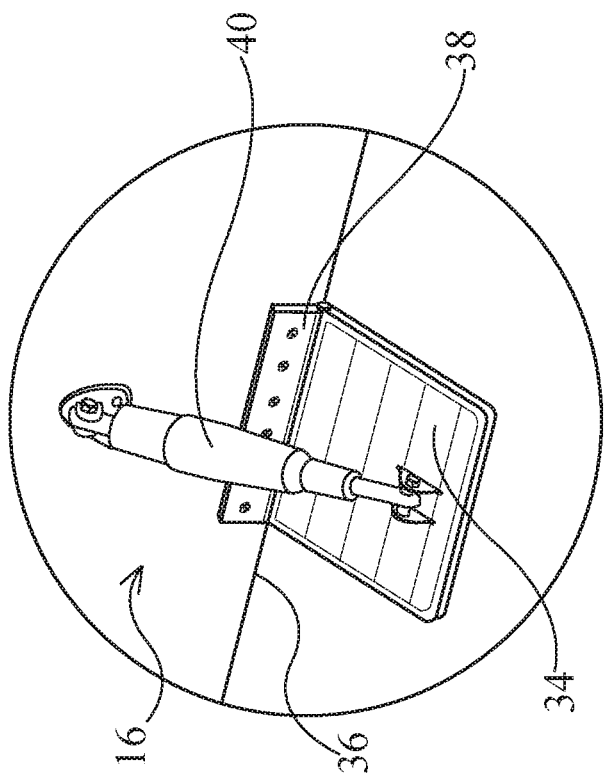
FIG. 4 is an enlarged view of the port trim tab assembly of the marine vessel of FIG. 1 shown in a deployed configuration.
Figure 3:
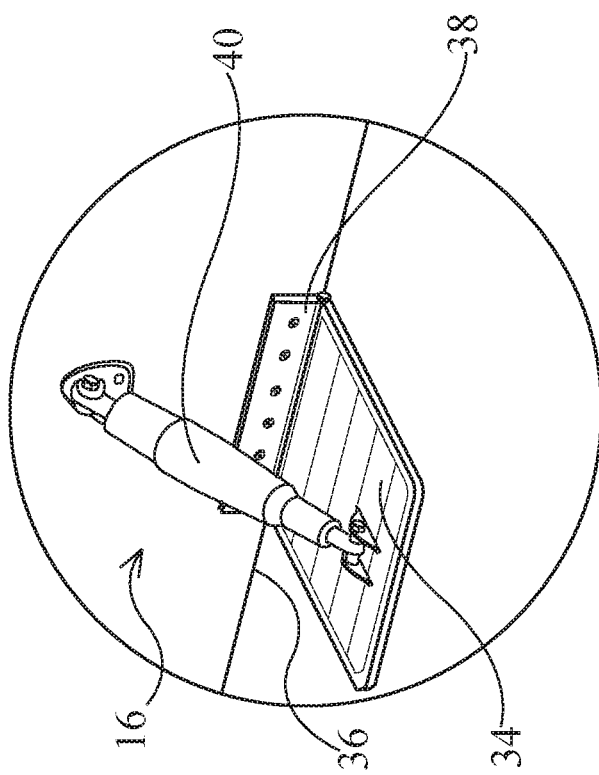
FIG. 3 is an enlarged view of a port trim tab assembly of the marine vessel of FIG. 1 shown in a retracted configuration.

The port trim tab assembly 16 and the starboard trim tab assembly 18 are shown in greater detail in FIG. 2. The port trim tab assembly 16 and the starboard trim tab assembly 18 are substantially the same in structure and function. Accordingly, only the port trim tab assembly 16 is described in detail herein with the understanding that the starboard trim tab assembly 18 has substantially the same structure and function in substantially the same manner. The port trim tab assembly 16 includes a trim tab 34 which is hingedly mounted adjacent a bottom edge 36 of the transom 14 of the marine vessel 10 by a hinge 38. The port trim tab assembly 16 also includes an actuator 40 which actuates the trim tab 34 between a retracted position, as shown in FIG. 3, and a deployed position, as shown in FIG. 4. Referring back to FIG. 2, the actuator 40 may be partially or fully below the waterline and is watertight.

Figure 5:
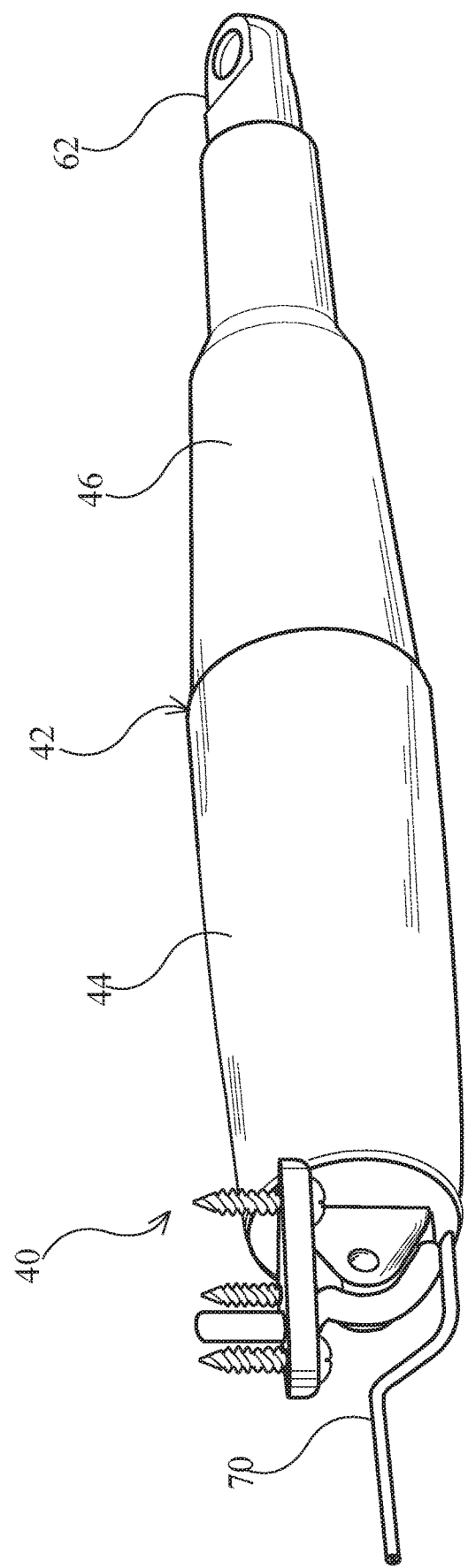
FIG. 5 is a perspective view of an actuator employed to retract and deploy the port trim tab as shown in FIGS. 3 and 4.
Figure 6:
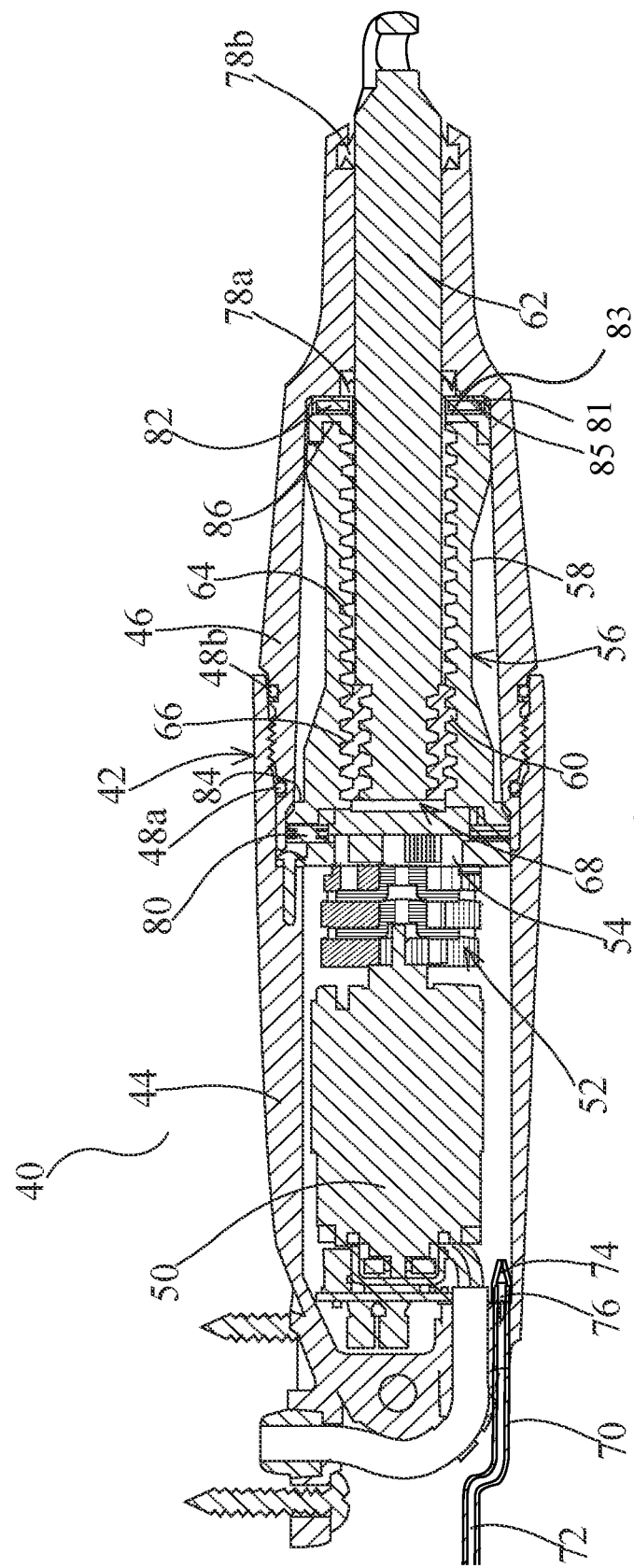
FIG. 6 is a sectional view of the actuator employed to retract and deploy the port trim tab as shown in FIGS. 3 and 4, with the actuator in a retracted position.
Figure 7:
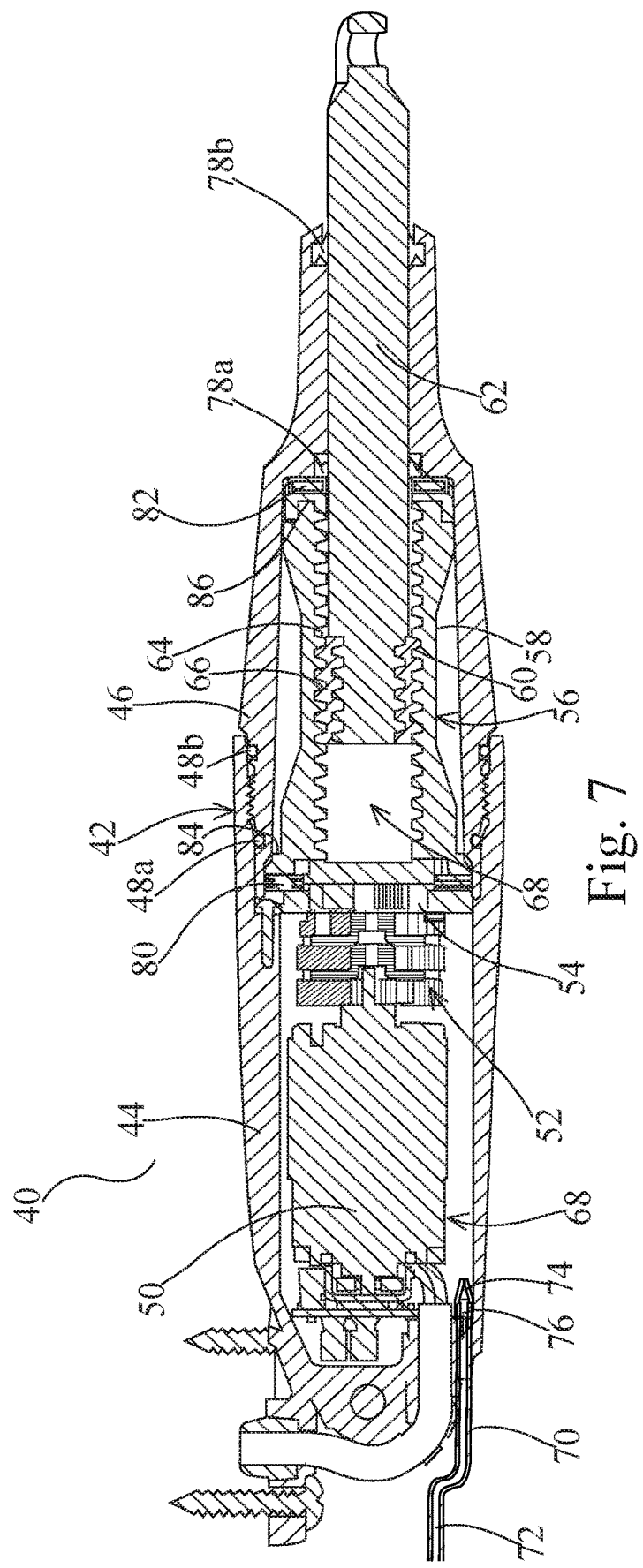
FIG. 7 is a sectional view of the actuator employed to retract and deploy the port trim tab as shown in FIGS. 3 and 4, with the actuator in an extended position.

The actuator 40 is an electric actuator and is shown in greater detail in FIGS. 5 and 6. The actuator 40 generally includes a housing 42 which, in this example, has a first portion 44 and a second portion 46. The first portion 44 of the housing 42 and the second portion 46 of the housing 42 are threadedly connected and there are O-rings 48a and 48b which seal the first portion 44 of the housing 42 and the second portion 46 of the housing 42. There is a motor 50 disposed in the housing 42. The motor 50 is coupled to a planetary gear reduction 52 which includes a last stage planetary gear 54. The last stage planetary gear 54 is coupled to a drive tube assembly 56 which includes a drive tube 58 and a piston nut 60 coupled to an output shaft 62. The drive tube 58 has internal threads 64 and the piston nut 60 has external threads 66. The internal threads 64 of the drive tube 58 and the external threads 66 of the piston nut 60 are threadedly engaged. The motor 50 rotates the drive tube 58. Rotation of drive tube 58 accordingly causes the piston nut 60 to reciprocate along a length of the drive tube 58 and the output shaft 62 to reciprocate relative to the housing 42. The internal threads 64 of the drive tube 58 and the external threads 66 of the piston nut 60 may be larger in diameter than threads that threadedly engage the piston nut 60 and the output shaft 62. This results in increased thread load carrying capacity.

The diameter of the output shaft 62 may also be decreased to the inner diameter of the drive tube 58. A decreased diameter of the output shaft 62 means a decreased change in an internal volume 68 of the actuator 40 when the output shaft 62 reciprocates relative to the housing 42. The internal volume 68 of the housing 42 increases when the output shaft 62 is extended from the housing 42. The increase in the internal volume 68 of the housing 42 results in a negative air pressure in the housing 42 which is compensated by air flowing into the housing 42 through a vent conduit 70. The vent conduit 70 has a first end 72 in fluid communication with the atmosphere and a second end 74 in fluid communication with the internal volume 68 of the housing 42. There is a check valve 76 disposed at the second end 74 of the vent conduit 70. Air can accordingly flow through the vent conduit 70 into the housing 42 but not out of the housing 42. A positive air pressure is thereby created in the housing 42 when the output shaft 62 is extended and retracted into the housing 42. This restricts the ingress of water into the housing 42. There are also seals 78a and 78b which seal the output shaft 62 against the housing 42 which also restricts the ingress of water into the housing 42. A decreased diameter of the output shaft 62 facilitates sealing.

The actuator 40 also includes axial bearings 80 and 82 as well as radial bearings 84 and 86 which transfer axial loads and radial loads from the drive tube 58 to the housing 42. This allows for proper load transfer in both the push direction and pull direction. It is desirable to also have proper load transfer in the pull direction because trim tabs are often employed as steps to get in to and out of marine vessels. It is also desirable to have proper load transfer in both the push direction and pull direction if an actuator is being employed in a wake gate assembly in which the actuator needs to be loaded in both the push direction and the pull direction. The axial bearing 82 includes rolling elements 81 between bearing surfaces 83 and 85.

Figure 8:
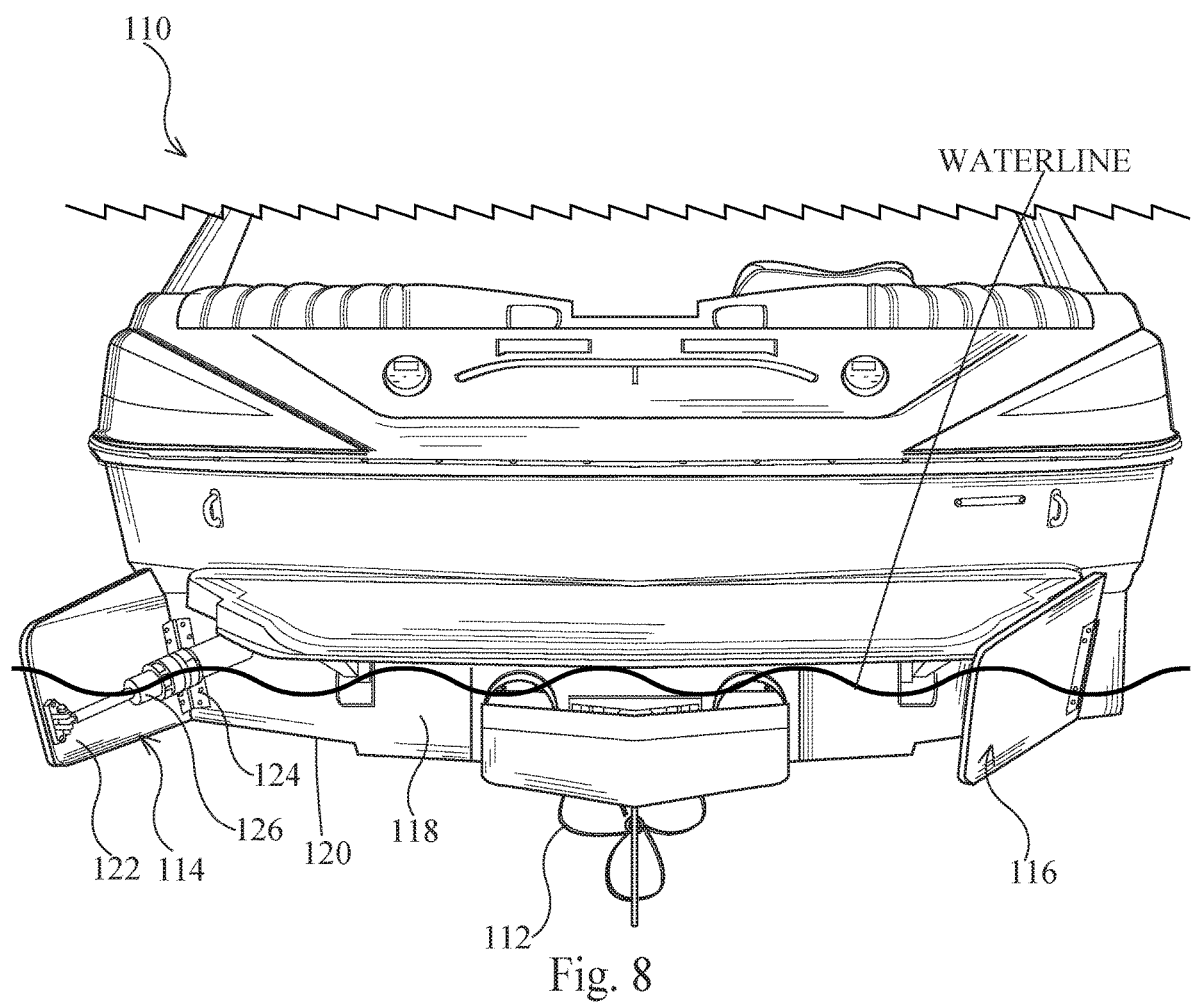
FIG. 8 is an end view of a marine vessel showing wake gate assemblies mounted on a transom thereof.

FIG. 8 shows a marine vessel 110 provided with a propulsion unit which, in this example, is in the form of an inboard engine 112. However, the marine vessel may be provided with any number or form of propulsion units in other examples. The marine vessel 110 is also provided with a port wake gate assembly 114 and a starboard wake gate assembly 116. The port wake gate assembly 114 and the starboard wake gate assembly 116 are each mounted on a transom 118 of the marine vessel 110 in a conventional manner.

The port wake gate assembly 114 and the starboard wake gate assembly 116 are substantially the same in structure and function. Accordingly, only the port wake gate assembly 114 is described in detail herein with the understanding that the starboard wake gate assembly 116 has substantially the same structure and functions in substantially the same manner. The port wake gate assembly 114 includes a wake tab 122 which is hingedly mounted adjacent a bottom edge 120 of the transom 118 of the marine vessel 110 by a hinge 124. The port wake gate assembly 114 also includes an actuator 126 which actuates the wake tab 122 between a retracted position, as shown in FIG. 9, and a deployed position, as shown in FIG. 10. Referring back to FIG. 8, the actuator 126 may be partially or fully below the waterline and is watertight.

Figure 11:
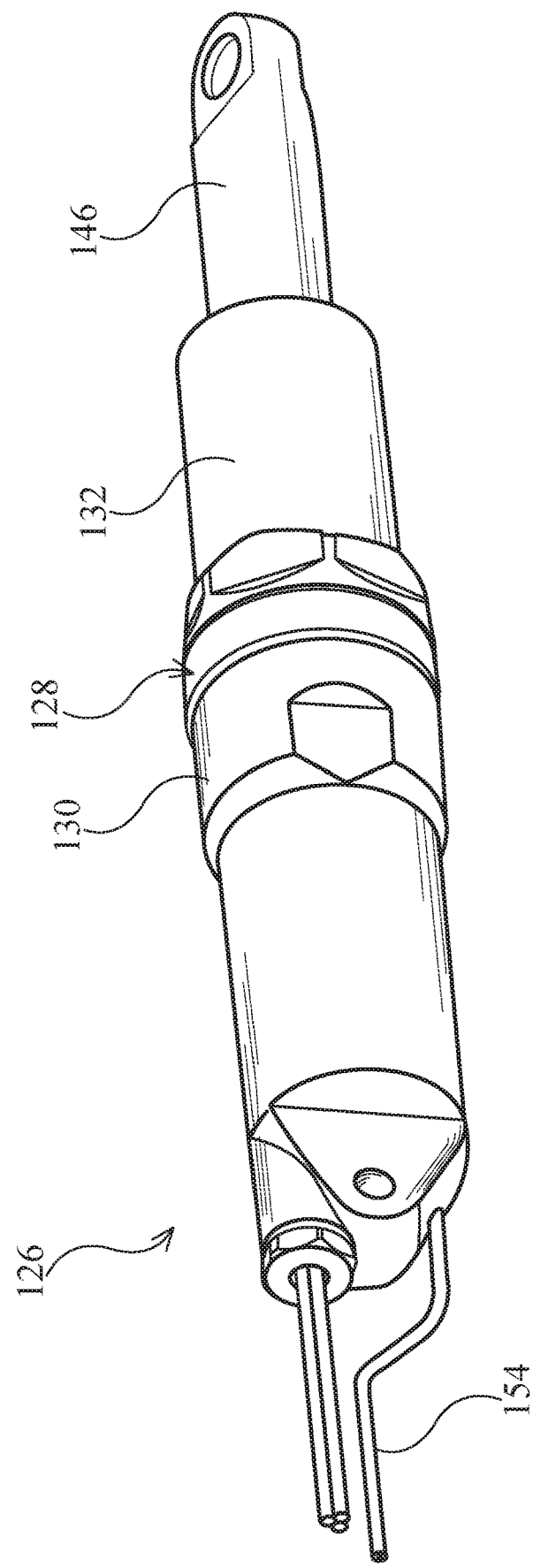
FIG. 11 is a perspective view of an actuator employed to retract and deploy the port wake gate assembly as shown in FIGS. 9 and 10.
Figure 12:
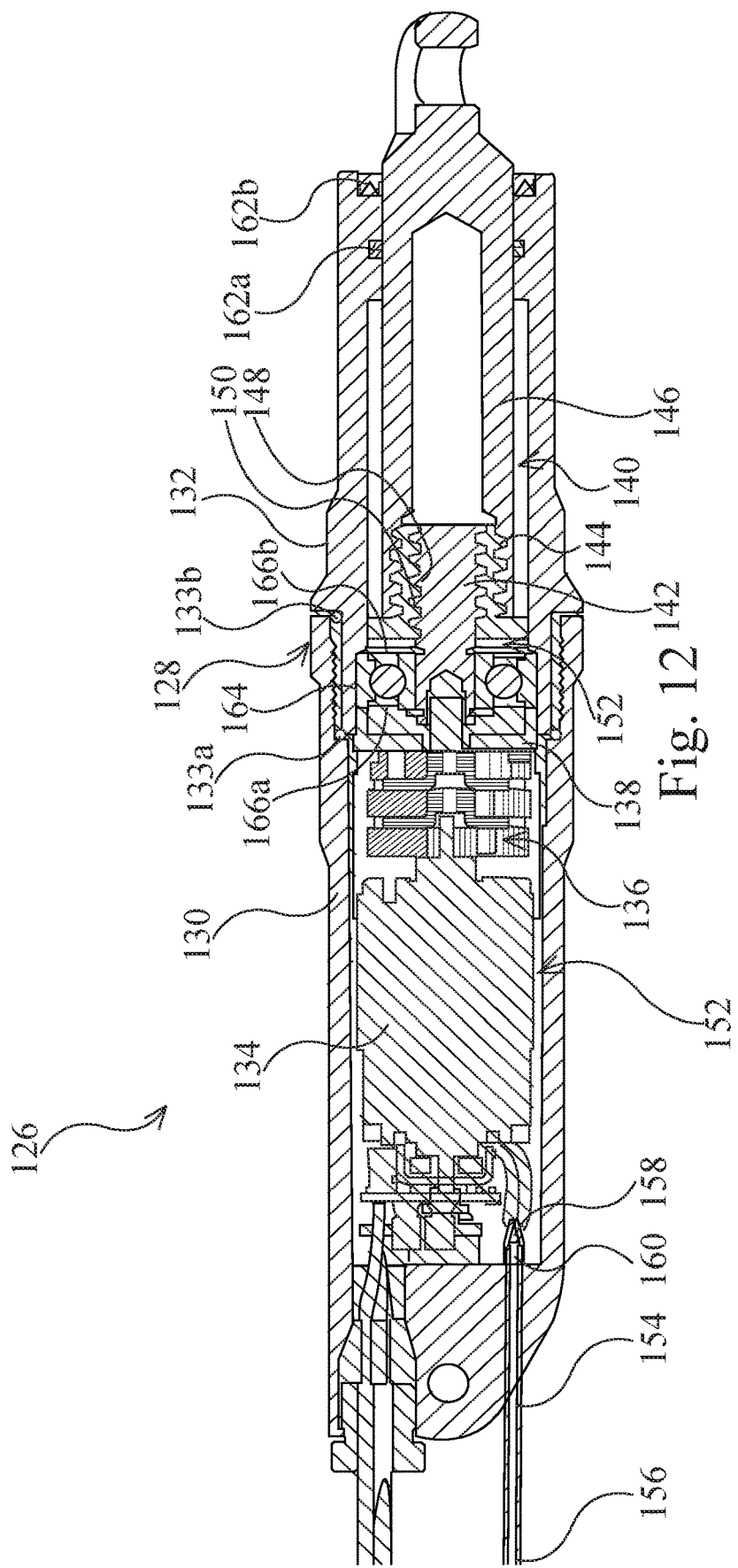
FIG. 12 is a sectional view of the actuator employed to retract and deploy the port wake gate assembly as shown in FIGS. 9 and 10, with the actuator in a retracted position.
Figure 13:
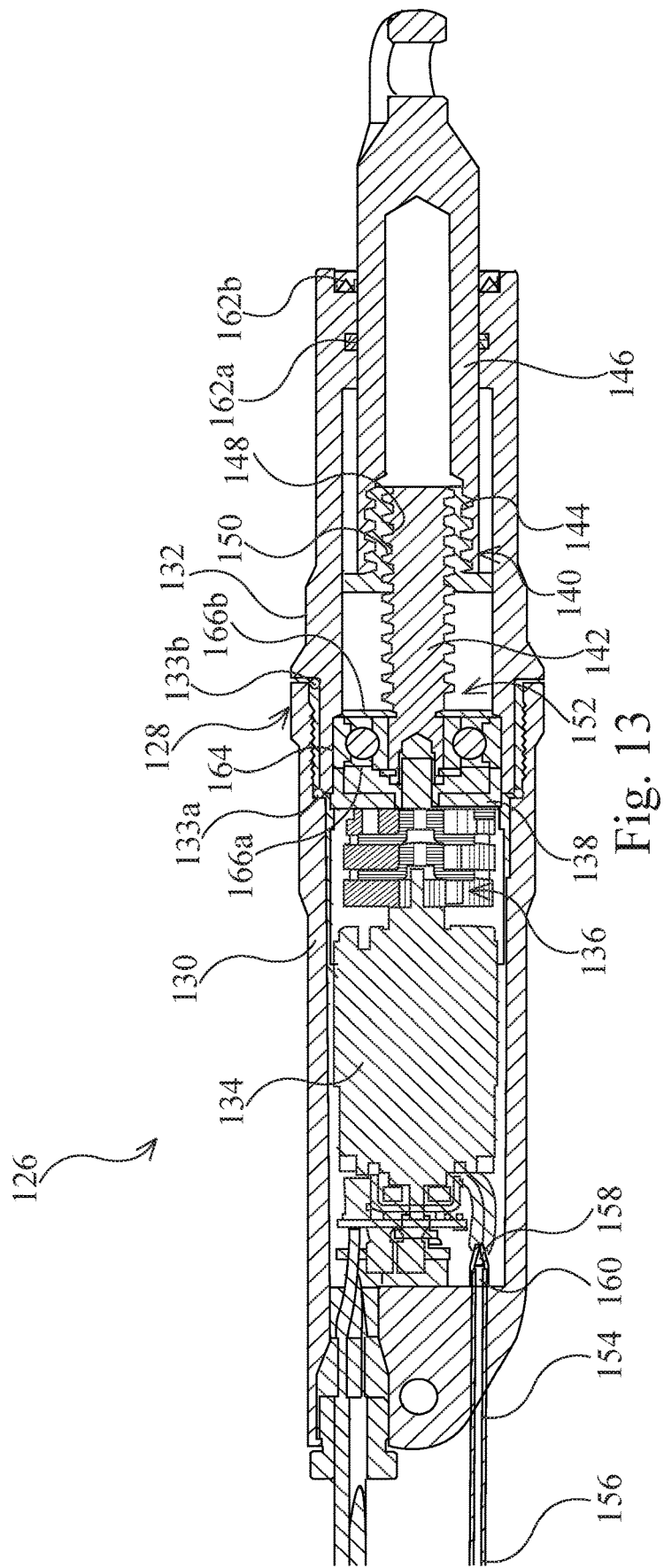
FIG. 13 is a sectional view of the actuator employed to retract and deploy the port wake gate assembly as shown in FIGS. 9 and 10, with the actuator in an extended position.

The actuator 126 is an electric actuator and is shown in greater detail in FIGS. 11 and 12. The actuator 126 generally includes a housing 128 which, in this example, has a first portion 130 and a second portion 132. The first portion 130 of the housing 128 and the second portion 132 of the housing 128 are threadedly connected and there are O-rings 133a and 133b which seal the first portion 130 of the housing 128 and the second portion 132 of the housing 128. There is a motor 134 disposed in the housing 128. The motor 134 is coupled to a planetary gear reduction 136 which includes a last stage planetary gear 138. The last stage planetary gear 138 is coupled to a drive shaft assembly 140 which includes a drive shaft 142 and a piston nut 144 coupled to an output shaft 146. The drive shaft 142 has external threads 148 and the piston nut 144 has internal threads 150. The external threads 148 of the drive shaft 142 and the internal threads 150 of the piston nut 144 are threadedly engaged. The motor 134 rotates the drive shaft 142. Rotation of drive shaft 142 accordingly causes the piston nut 144 to reciprocate along a length of the drive shaft 142 and the output shaft 146 to reciprocate relative to the housing 128. The external threads 148 of the drive shaft 142 and the internal threads 150 of the piston nut 144 may be larger in diameter than threads that threadedly engage the piston nut 144 and the output shaft 146. This results in increased thread load carrying capacity.

An internal volume 152 of the housing 128 increases when the output shaft 146 is extended from the housing 128. The increase in the internal volume 152 of the housing 128 results in a negative air pressure in the housing 128 which is compensated by air flowing into the housing 128 through a vent conduit 154. The vent conduit 154 has first end 156 in fluid communication with the atmosphere and a second end 158 in fluid communication with the internal volume of the housing 128. There is a check valve 160 disposed at the second end 158 of the vent conduit 154. Air can accordingly flow through the vent conduit 154 into the housing 128 but not out of the housing 128. A positive air pressure is thereby created in the housing 128 when the output shaft 146 is extended and retracted into the housing 128. This restricts the ingress of water into the housing 128. There are also seals 162*a* and 162*b* which seal the output shaft 146 against the housing 128 which also restricts the ingress of water into the housing 128. A decreased diameter of the output shaft 146 facilitates sealing.

The actuator 126 also includes bearings 164 which transfer axial loads and radial loads from the drive shaft 142 to the housing 128. The bearings 164 are retained by circlips 166*a* and 166*b* in this example. This allows for proper load transfer in both the push direction and pull direction.

It will be understood by a person skilled in the art that the actuator of the trim tab assembly disclosed herein may be employed as part of a wake gate assembly. Likewise, the actuator of the wake gate assembly disclosed herein may be employed as part of a trim tab assembly.

It will also be understood by a person skilled in the art that many of the details provided above are by way of example only, and are not intended to limit the scope of the invention which is to be determined with reference to the following claims.

What is claimed is:

1. An actuator comprising:
   a housing;
   a drive tube assembly disposed within the housing, the drive tube assembly including a drive tube provided with internal threads, a piston nut provided with external threads which threadedly engage the internal threads of the drive tube, and an output shaft connected to the piston nut;
   a motor, the motor operable to rotate the drive tube to cause the piston nut to reciprocate along a length of the drive tube and the output shaft to reciprocate relative to the housing; and
   first and second axial-only bearings operable to transmit axial loads from the drive tube to the housing;
   the drive tube having a first axial end and a second axial end axially opposite the first axial end,
   the first axial-only bearing positioned at the first axial end of the drive tube, and the second axial-only bearing positioned at the second axial end of the drive tube.

2. The actuator as claimed in claim 1, wherein the piston nut is threadedly connected to the output shaft and the external threads of the piston nut are larger in diameter than threads that threadedly connect the piston nut to the output shaft.

3. The actuator as claimed in claim 1, further including a planetary gear reduction coupling the motor to the drive tube.

4. The actuator as claimed in claim 1, further including a vent tube allowing fluid communication between the atmosphere and an interior of the housing.

5. The actuator as claimed in claim 1, wherein the actuator is watertight.

6. The actuator as claimed in claim 1, wherein the actuator is part of a trim tab assembly or a wake gate assembly.

7. The actuator as claimed in claim 1, further including at least one radial bearing operable to transmit radial loads from the drive tube to the housing.

8. The actuator as claimed in claim 1, wherein the drive tube is positioned to transmit radial loads from the output shaft to the housing by sliding contact between the drive tube and the housing.

9. The actuator as claimed in claim 1, wherein the first axial-only bearing is operable to transmit axial loads from the drive tube to the housing in a push direction, and wherein the second axial-only bearing is operable to transmit axial loads from the drive tube to the housing in a pull direction opposite the push direction.

10. An actuator comprising:
    a housing;
    a drive tube assembly disposed within the housing, the drive tube assembly including a drive tube provided with internal threads, a piston nut provided with internal external threads which threadedly engage the internal threads of the drive tube, and an output shaft connected to the piston nut;
    a motor, the motor operable to rotate the drive tube to cause the piston nut to reciprocate along a length of the drive tube and the output shaft to reciprocate relative to the housing; and
    first and second axial-only bearings operable to transmit axial loads from the drive tube to the housing,
    wherein the drive tube having a first axial end and a second axial end axially opposite the first axial end,
    wherein the first axial-only bearing positioned at the first axial end of the drive tube,
    wherein the second axial-only bearing positioned at the second axial end of the drive tube,
    wherein each of the first and second axial-only bearings comprises bearing surfaces and rolling elements positioned between the bearing surfaces, and
    wherein each of the first and second axial-only bearings is devoid of radially opposed bearing surfaces contacting any rolling elements of each of the first and second axial-only bearings.

11. The actuator as claimed in claim 10, wherein the piston nut is threadedly connected to the output shaft and the external threads of the piston nut are larger in diameter than threads that threadedly connect the piston nut to the output shaft.

12. The actuator as claimed in claim 10, further including a planetary gear reduction coupling the motor to the drive tube.

13. The actuator as claimed in claim 10, further including a vent tube allowing fluid communication between the atmosphere and an interior of the housing.

14. The actuator as claimed in claim 10, wherein the actuator is watertight.

15. The actuator as claimed in claim 1, wherein the actuator is part of a trim tab assembly or a wake gate assembly.

16. The actuator as claimed in claim 10, further including at least one radial bearing operable to transmit radial loads from the drive tube to the housing.

17. The actuator as claimed in claim 10, wherein the drive tube is positioned to transmit radial loads from the output shaft to the housing by sliding contact between the drive tube and the housing.

18. The actuator as claimed in claim 10, wherein the first axial bearing is operable to transmit axial loads from the drive tube to the housing in a push direction, and wherein the second axial bearing is operable to transmit axial loads from the drive tube to the housing in a pull direction opposite the push direction.

* * * * *